United States Patent [19]

Kramer et al.

[11] 4,098,293

[45] Jul. 4, 1978

[54] FLUID PRESSURE COUPLING ARRANGEMENT

[75] Inventors: Volker Kramer, Erdmannhausen; Siegfried Rispeter, Plochingen; Rolf-Peter Marlow, Ditzingen, all of Fed. Rep. of Germany

[73] Assignee: Dr. Ing. h.c.F. Porsche Aktiengesellschaft, Fed. Rep. of Germany

[21] Appl. No.: 726,562

[22] Filed: Sep. 27, 1976

[30] Foreign Application Priority Data

Sep. 26, 1975 [DE] Fed. Rep. of Germany ....... 2542919

[51] Int. Cl.² .............................................. F16L 37/28
[52] U.S. Cl. ............................ 137/614.03; 137/614.02
[58] Field of Search .............. 137/614, 614.04, 614.05, 137/614.06, 614.03

[56] References Cited

U.S. PATENT DOCUMENTS

| | | | |
|---|---|---|---|
| 2,637,572 | 5/1953 | Bruce | 137/614.02 |
| 3,550,624 | 12/1970 | Johnson | 137/614.05 |
| 3,777,771 | 12/1973 | De Visscher | 137/614 |

*Primary Examiner*—Martin P. Schwadron
*Assistant Examiner*—A. Michael Chambers
*Attorney, Agent, or Firm*—Craig & Antonelli

[57] ABSTRACT

A coupling arrangement for pressure fluid lines which includes at least two coupling sections which are adapted to be selectively coupled and uncoupled. A separator device is arranged at least within the area of the coupling members when in a coupled position for separating the medium which is not compatible with the medium in the fluid pressure system and preventing the introduction of the non-compatible medium into the pressure fluid lines during a coupling operation.

12 Claims, 3 Drawing Figures

FLUID PRESSURE COUPLING ARRANGEMENT

The present invention relates to a coupling and, more particularly, to a coupling for pressure fluid lines wherein the coupling sections are provided with an arrangement for automatically closing a shut-off device during the coupling and uncoupling operation.

Couplings for selectively connecting and disconnecting fluid pressure lines have been proposed which strive to complete the coupling process as quickly as possible and in an effortless manner. A disadvantage of the proposed couplings lies in the fact that a foreign substance or substance incompatible with the fluid in the pressure lines in normally enclosed between the coupling members during the coupling process with the foreign substance then entering the pressure fluid lines to be connected. For example, assuming an air pocket exists between the coupling members, upon connecting the fluid pressure lines, the trapped air would then form air bubbles in the pressure system, thereby requiring a venting or bleeding of the entire system sebsequent to the coupling process in order to release the air bubbles therefrom.

The present invention is concerned with the task to provide a structurally simple fluid pressure coupling arrangement which operates reliably and which ensures a connection of the pressure fluid line without the entrapment of an incompatible medium, for example, air or the like in the pressure fluid line.

The underlying problems are solved in accordance with the present invention by providing a separation arrangement which contains a fluid agent or medium compatible with the medium of the pressure system at least within the connecting area of the coupling sections of the coupling.

According to one feature of the present invention, the separation arrangement is fashioned as a tubular sleeve element or muff provided with a ring-shaped groove filled with a compatible agent or medium.

According to a further feature of the present invention, one of the coupling sections is connected with the tubular sleeve by a screw-type fastening with the other coupling section being axially movable and guidingly sealed in the sleeve. A swingable cover is provided for closing the tubular sleeve so as to seal the space containing the compatible agent or medium toward the outside of the coupling.

One advantage of the separation device of the present invention resides in the fact that the respective sections of the coupling are telescopically arranged with respect to one another at least within the connecting area of the coupling, at which connecting area is provided the compatible medium in the separating device such that any empty spaces formed at the connecting area are filled with the compatible medium of the separator, thereby precluding any entrapment of a non-compatible substance such as, for example, air or the like.

Accordingly, it is an object of the present invention to provide a fluid pressure coupling arrangement which avoids by simple means the afore-mentioned shortcomings and drawbacks encountered in the prior art.

Another object of the present invention resides in providing a fluid pressure coupling arrangement which is relatively simple in construction and therefor also relatively inexpensive.

A further object of the present invention resides in providing a fluid pressure coupling which assures a quick connect and disconnect of fluid pressure lines in an effortless manner.

A still further object of the present invention resides in providing a fluid pressure coupling which minimizes failures or breakdowns due to the leaks in the fluid pressure system.

These and further objects, features and advantages of the present invention will become more apparent from the following description when taken in connnection with the accompanying drawing which shows, for the purposes of illustration only, one embodiment in accordance with the present invention, and wherein.

Figure 1:
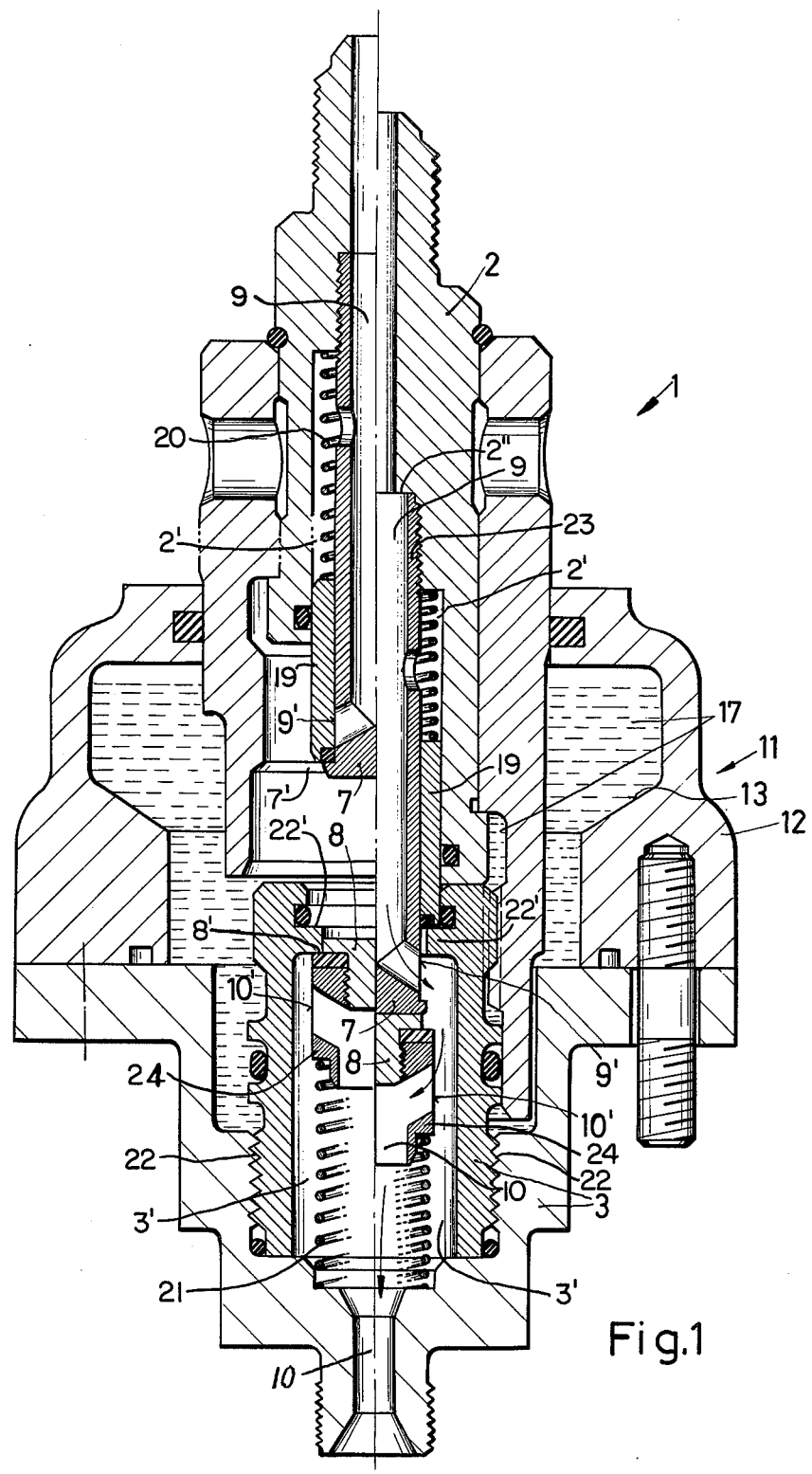
FIG. 1 is a partial cross-sectional view of a coupling in accordance with the present invention in a coupled and separated or uncoupled position.

Referring now to the drawings wherein like reference numerals are used throughout the various views to designate like parts and, more particularly, to FIG. 1, according to this figure, a coupling arrangement, generally designated by the reference numeral 1, includes a first coupling section or coupling half 2 axially movable and sealingly guided in a second coupling section or coupling half 3. The coupling section 2 is provided with an axially extending fluid conducting bore 9 in an element 23 with the bore 9 terminating in inclined fluid conducting passages 9'. A valve member 7 is arranged at an end of the bore 9 and cooperates with a valve seat 7' arranged at an end of a tubular sleeve-like element 19. A spring 20 is accommodated in a space 2' formed in the coupling section 2 and normally biases the sleeve 19 in the direction of the valve member 7 so as to seat the same against the valve seat 7'.

The coupling section 3 is provided with an axially extending fluid conducting bore 10 provided in an element 24 with the bore 10 terminating in inclined fluid conducting passages 10'. A valve member 8 is arranged on the element 24 at the upper end of the bore 10 and cooperates with a valve seat 8' arranged at an inturned section or shoulder 22' of a tubular-shaped element 22 that is a part of the coupling section 3. A spring 21 is accommodated in a space 3' and normally biases the element 24 and therewith the valve member 8 into engagement with the valve seat 8'.

As shown in the left-hand side of FIG. 1, with the coupling sections 2, 3 separated, the valve members 7, 8 are seated against their associated valve seats 7', 8', thereby sealing passages 9', 10'.

Figure 2:
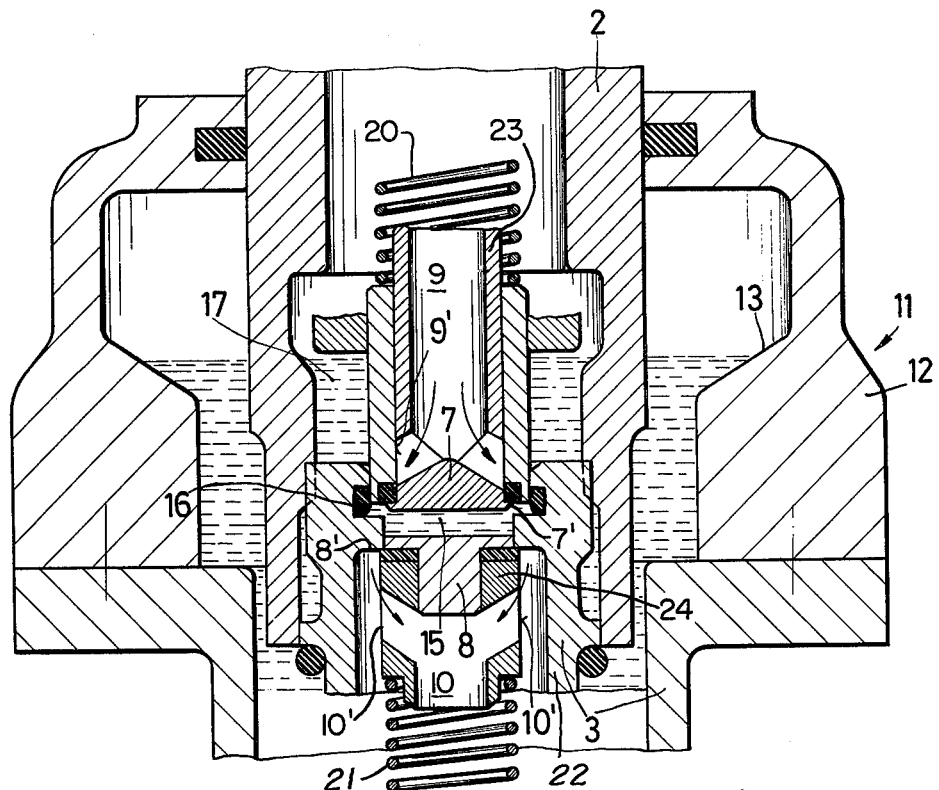
FIG. 2 is a partial cross-sectional view of the coupling of FIG. 1 during a coupling process.

During the coupling process, the coupling section 2 is inserted, for example, by screwing, into the coupling section 3, with the spring 20 maintaining the valve member 7 against the valve seat 7', thereby maintaining the sealing of the passages 9' with FIG. 2 illustrating the relative positions of the respective coupling sections 2, 3 and associated elements just prior to the completion of the coupling process.

Upon continued insertion of the coupling section 2, as shown in the right-hand side of FIG. 1, the edge of the element 23 is brought into engagement with an upper surface of the shoulder 22'. By virtue of the provision of a shoulder 2" engaging the upper end of the element 23, the continued insertion of the coupling section 2 results in the passages 9 being opened by a displacement of the element 23 beyond the end of the sleeve 19.

The continued insertion of the coupling section 2 results in the valve member 7 engaging the upper surface of the valve member 8 so as to displace the same away from the valve seat 8' against the bias of the spring 21, thereby communicating the passages 9' with the passages 10' and allowing an unimpeded flow of the pressure fluid from the bore 9 to the bore 10. As apparent, upon removal of the coupling section 2, the spring 21 biases the valve 8 into engagement with the valve seat 8' and the valve member 7 seats against the valve seat 7', thereby sealing the passages, 9, 9' and 10, 10'.

As shown most clearly in FIG. 2, just prior to the completion of a coupling operation, an empty space 15 would be formed between the coupling sections 2, 3 and, especially, between the valve members 7, 8, which space would be sealed from the outside by virtue of the presence of the sealing means, for example, O-rings 16. This space 15 could accommodate a non-compatible medium which would then enter into the pressure system upon a completion of the coupling process.

To prevent the entrapment of a non-compatible medium in the space 15, a separator device, generally designated by the reference numeral 11, is arranged at least in the connnecting area of the coupling section 2, 3. The separating device 11 may be secured to the coupling section 3 by suitable conventional fasteners and be constructed as a tubular sleeve or muff 12 provided with a ring groove 13 filled with a fluid medium 17 compatible with the fluid in the pressure system.

Figure 3:
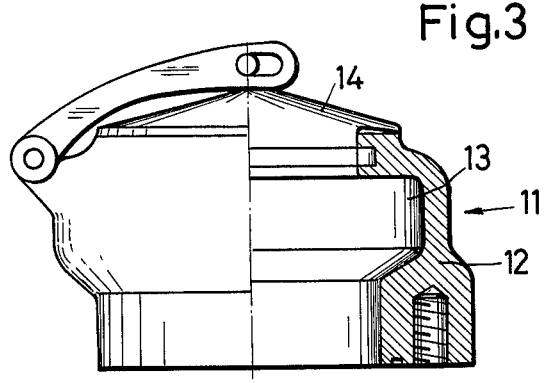
FIG. 3 is a partial cross-sectional side view of a cover of the coupling in accordance with the present invention.

As shown most clearly in FIGS. 1 and 3, the fluid medium 17 fills the space 15 and all other resulting spaces between the coupling sections 2, 3. By virtue of the presence of the fluid medium 17 at least in the connecting area of the coupling sections, the entrapment of a non-compatible medium such as, for example, air, is precluded, thereby preventing the feeding of the non-compatible medium into the pressure system as is the case in conventional couplings. Consequently, the provision of the separator device 11 dispenses with the need of venting or bleeding the pressure system prior to using the same to eliminate trapped air or the like from such system.

In order to maintain the fluid medium 17 in the separator device 11 when the coupling sections 2, 3 are uncoupled and to prevent contamination of such medium, the ring groove 13 is sealed off opposite the coupling sections 2, 3 by a pivotable cover or cap 14 shown most clearly in FIG. 3.

During a coupling operation, the cover or cap 14 is opened and the coupling section 2 is inserted into the coupling section 3, resulting in a displacement of the fluid medium 17 such that the medium surrounds the coupling section 2. Continued insertion of the coupling section 2 results in either displacing of the fluid medium 17 out into the ring groove 13 or, since the medium 17 is compatible with the medium in the system, a flowing of the medium 17 from the space 15 into the passages 10' and bore 10. Any non-compatible substance, for example, air, which may be present in the coupling sections is displaced from the ring-shaped groove 13 as a result of the rising level of the fluid medium 17 with the non-compatible substance venting to the outside through the coupling sections 2, 3.

Figure 4:
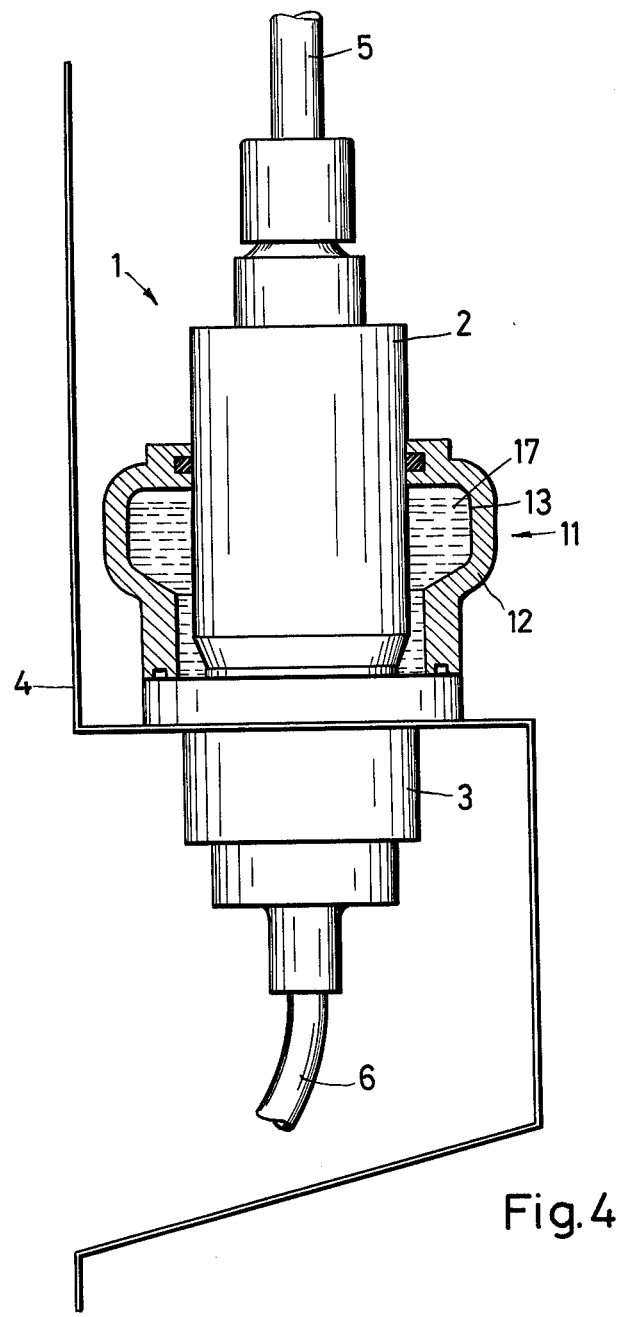
FIG. 4 is a partial cross-sectional view of the coupling of the present invention in a mounted position.

FIG. 4 provides an illustration of a practical application of the coupling arrangement of the present invention as applied to a brake system or other hydraulic system of a vehicle. The coupling section 3 is stationarily mounted to a wall 4 of a vehicle body (not shown) with the coupling section 2 being inserted into the coupling section 3 during a coupling operation. The connecting area of the coupling sections 2, 3 has arranged thereat the separator device 11 with pressure fluid lines 5, 6 communicating with the bores 9, 10 of the coupling sections and with the specific elements of the brake system or other hydraulic system of the vehicle.

While we have shown and described only one embodiment in accordance with the present invention, it is understood that the same is not limited thereto, but is susceptible of numerous changes and modifications as known to those skilled in the art and we therefor do not wish to be limited to the details shown and described herein, but intend to cover all such changes and modifications as encompassed by the scope of the appended claims.

We claim:

1. A coupling arrangement for pressure fluid lines, the arrangement comprising:
   at least two coupling members adapted to be selectively coupled and uncoupled, and
   separator means provided at least in the connecting area of said coupling members for preventing the introduction of a non-compatible medium in the pressure fluid lines during a coupling operation, said separator means defining a chamber surrounding a coupling end of one coupling member and containing a medium compatible with the medium in the pressure fluid lines,
   whereby, upon another coupling member being inserted into said chamber during a coupling operation, a connecting of the coupling members occurs beneath a surface line of the compatible medium in said chamber.

2. An arrangement according to claim 1, wherein the non-compatible medium is air.

3. An arrangement according to claim 1, wherein a cover means is provided for selectively sealing the preventing means from the atmosphere when the coupling members are in an uncoupled condition.

4. An arrangement according to claim 1, wherein each of said coupling members includes a valve member, said valve members together forming a space filled with the compatible medium during a coupling operation, said space being beneath the surface line of the compatible medium in said separator means, whereby any non-compatible medium is prevented from being introduced into the pressure fluid lines.

5. An arrangement according to claim 1, wherein each of said coupling members includes a means for automatically opening the coupling members during a coupling operation and automatically closing the coupling members during an uncoupling operation.

6. An arrangement according to claim 5, wherein said separator means includes a tubular member surrounding at least a portion of the coupling members in a coupled position, said tubular member defining an annular space for accommodating the compatible medium.

7. An arrangement according to claim 6, wherein the non-compatible medium is air.

8. An arrangement according to claim 7, wherein means are provided for securely fastening the tubular member to one of the coupling members, and means are provided for axially movably and sealingly guiding the other coupling member in the tubular member.

9. An arrangement according to claim 8, wherein a cover means is provided for selectively sealing the tubular member from the atmosphere when the coupling members are in an uncoupled condition.

10. An arrangement according to claim 1, wherein said separator means includes a tubular member surrounding at least a portion of the coupling members in a coupled position, said tubular member including an annular groove means accommodating a medium compatible with the fluid in the pressure fluid lines.

11. An arrangement according to claim 10, wherein means are provided for securely fastening the tubular member to one of the coupling members, and means are provided for axially movably and sealingly guiding the other coupling member in the tubular member.

12. An arrangement according to claim 11, wherein a cover means is provided for selectively sealing the tubular member from the atmosphere when the coupling members are in an uncoupled condition.

* * * * *